US012549296B2

(12) United States Patent
Polaganga

(10) Patent No.: US 12,549,296 B2
(45) Date of Patent: Feb. 10, 2026

(54) FLEXIBLE THRESHOLD-BASED CARRIER AGGREGATION

(71) Applicant: T-Mobile USA, Inc., Bellevue, WA (US)

(72) Inventor: Roopesh Kumar Polaganga, Bothell, WA (US)

(73) Assignee: T-Mobile USA, Inc., Bellevue, WA (US)

(*) Notice: Subject to any disclaimer, the term of this patent is extended or adjusted under 35 U.S.C. 154(b) by 417 days.

(21) Appl. No.: 18/169,022

(22) Filed: Feb. 14, 2023

(65) Prior Publication Data

US 2024/0275534 A1  Aug. 15, 2024

(51) Int. Cl.
H04L 5/00 (2006.01)
H04W 72/0453 (2023.01)
H04W 72/23 (2023.01)

(52) U.S. Cl.
CPC ............ *H04L 5/001* (2013.01); *H04L 5/0098* (2013.01); *H04W 72/0453* (2013.01); *H04W 72/23* (2023.01)

(58) Field of Classification Search
CPC .. H04L 5/001; H04L 5/0098; H04W 72/0453; H04W 72/23
See application file for complete search history.

(56) References Cited

U.S. PATENT DOCUMENTS

| | | | |
|---|---|---|---|
| 8,908,560 B2 | 12/2014 | Maeda et al. | |
| 8,937,895 B2 | 1/2015 | Xu et al. | |
| 9,131,363 B2 | 9/2015 | Vujcic | |
| 9,137,001 B2 | 9/2015 | Shah et al. | |
| 9,210,637 B2 | 12/2015 | Wei | |
| 9,237,555 B2 | 1/2016 | Kim et al. | |
| 9,473,286 B1 | 10/2016 | Shipley et al. | |
| 9,596,631 B2 | 3/2017 | Aoyama et al. | |
| 9,736,741 B2 | 8/2017 | Wei | |
| 9,877,263 B1 | 1/2018 | Oroskar et al. | |

(Continued)

FOREIGN PATENT DOCUMENTS

| | | |
|---|---|---|
| CN | 104811929 B | 1/2020 |
| CN | 107770795 B | 3/2020 |

(Continued)

*Primary Examiner* — Omar J Ghowrwal
(74) *Attorney, Agent, or Firm* — Perkins Coie LLP

(57) ABSTRACT

Systems, methods, and devices that relate to flexible thresholds for activating and deactivating carrier aggregation are disclosed. In one example aspect, a method for wireless communication includes determining, by the base station, a set of carrier aggregation candidates. Each carrier aggregation candidate in the set of carrier aggregation candidates corresponds to a secondary component carrier and is associated with an activation threshold value and a deactivation threshold value that are determined based on a characteristic of the secondary component carrier. The method also includes determining, by the base station, a traffic load of the communication and transmitting, by the base station, a command to the user equipment to activate or deactivate a first carrier aggregation candidate in the set of carrier aggregation candidates based on the traffic load and the activation threshold value or the deactivation threshold value associated with the first carrier aggregation candidate.

18 Claims, 7 Drawing Sheets

(56) References Cited

U.S. PATENT DOCUMENTS

| | | |
|---|---|---|
| 10,123,339 B1 | 11/2018 | Bertz et al. |
| 10,129,889 B1 | 11/2018 | Marupaduga et al. |
| 10,218,472 B2 | 2/2019 | Aoyama et al. |
| 10,314,055 B1 | 6/2019 | Marupaduga et al. |
| 10,716,158 B1 | 7/2020 | Pawar et al. |
| 11,233,610 B2 | 1/2022 | Xu et al. |
| 2004/0157561 A1 | 8/2004 | Akerberg |
| 2011/0292891 A1 | 12/2011 | Hsieh et al. |
| 2013/0148560 A1 | 6/2013 | Yang et al. |
| 2013/0182668 A1 | 7/2013 | Xu et al. |
| 2016/0192384 A1* | 6/2016 | Huang ............... H04L 5/001 370/329 |
| 2017/0150548 A1 | 5/2017 | Shah et al. |
| 2023/0354281 A1* | 11/2023 | Zhang ............ H04W 72/0453 |

FOREIGN PATENT DOCUMENTS

| | | |
|---|---|---|
| CN | 106664697 B | 6/2020 |
| CN | 112262540 A | 1/2021 |
| CN | 107493588 B | 5/2021 |
| CN | 107801192 B | 5/2021 |
| EP | 3057370 B1 | 9/2017 |
| EP | 2775758 B1 | 1/2018 |
| EP | 2448322 B1 | 8/2018 |
| EP | 2600653 B1 | 8/2018 |
| EP | 2846488 B1 | 8/2018 |
| EP | 2863694 B1 | 8/2018 |
| EP | 2838215 B1 | 9/2021 |
| JP | 2014216909 A | 11/2014 |
| WO | 2011082545 A1 | 7/2011 |
| WO | 2013096928 A1 | 6/2013 |
| WO | 2013131250 A1 | 9/2013 |

\* cited by examiner

FLEXIBLE THRESHOLD-BASED CARRIER AGGREGATION

BACKGROUND

Carrier aggregation is a technique in wireless communication to increase the data rate per user and to provide better resource utilization. In addition, load balancing can be achieved with carrier aggregation by adopting channel selection schemes that take into account the optimal values for power, sub-channels and/or feedback thresholds.

BRIEF DESCRIPTION OF THE DRAWINGS

Detailed descriptions of implementations of the present technology will be described and explained through the use of the accompanying drawings.

Figure 1:
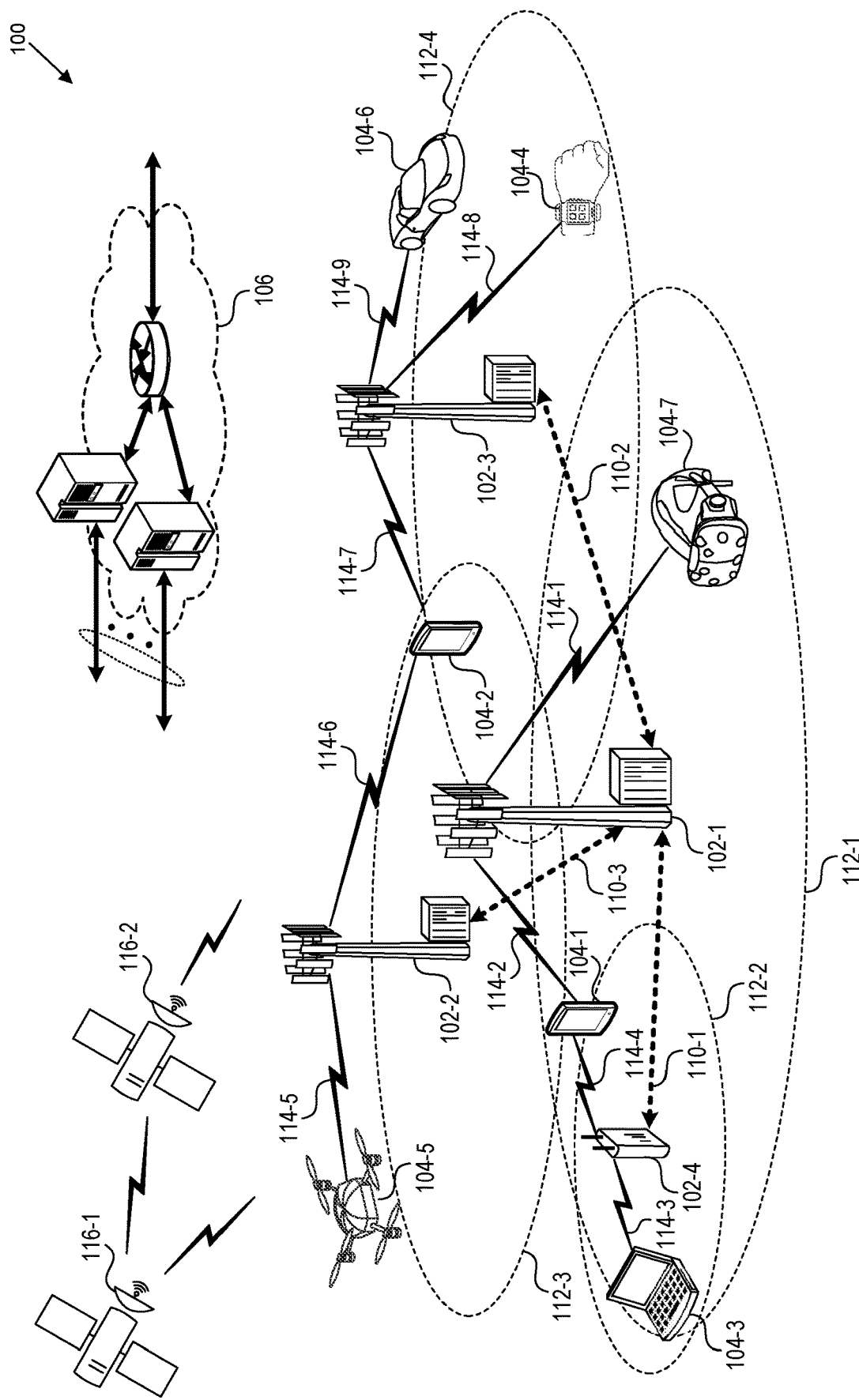
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Carrier aggregation can be used to provide better network resource utilization with increased bandwidths. The advance in wireless communication technologies, however, brings challenges to carrier aggregation techniques, especially when higher frequency bands with different bandwidths values are adopted. Different deployments of the Fifth Generation (5G) New Radio (NR) technology also create intricate problems for carrier aggregation. This patent document discloses techniques that can be implemented in various embodiments to enable flexible threshold values for activating and/or deactivating carrier aggregation. By assigning different activation/deactivation threshold values that take into account carrier characteristics (e.g., bandwidths, frequency ranges, duplexing modes, and/or deployment configurations), load balancing among carriers with different bandwidths can be achieved. For example, a lower threshold can be assigned to a carrier having a larger bandwidth to avoid congesting other carriers having smaller bandwidth. As another example, aggregation of inter-base station carriers can be assigned a lower priority to avoid additional delays. The disclosed techniques can also help mitigate possible efficiency loss and/or delays on certain backhaul links to achieve the optimal usage of network resources.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Carrier Aggregation with Flexible Thresholds

Figure 2:
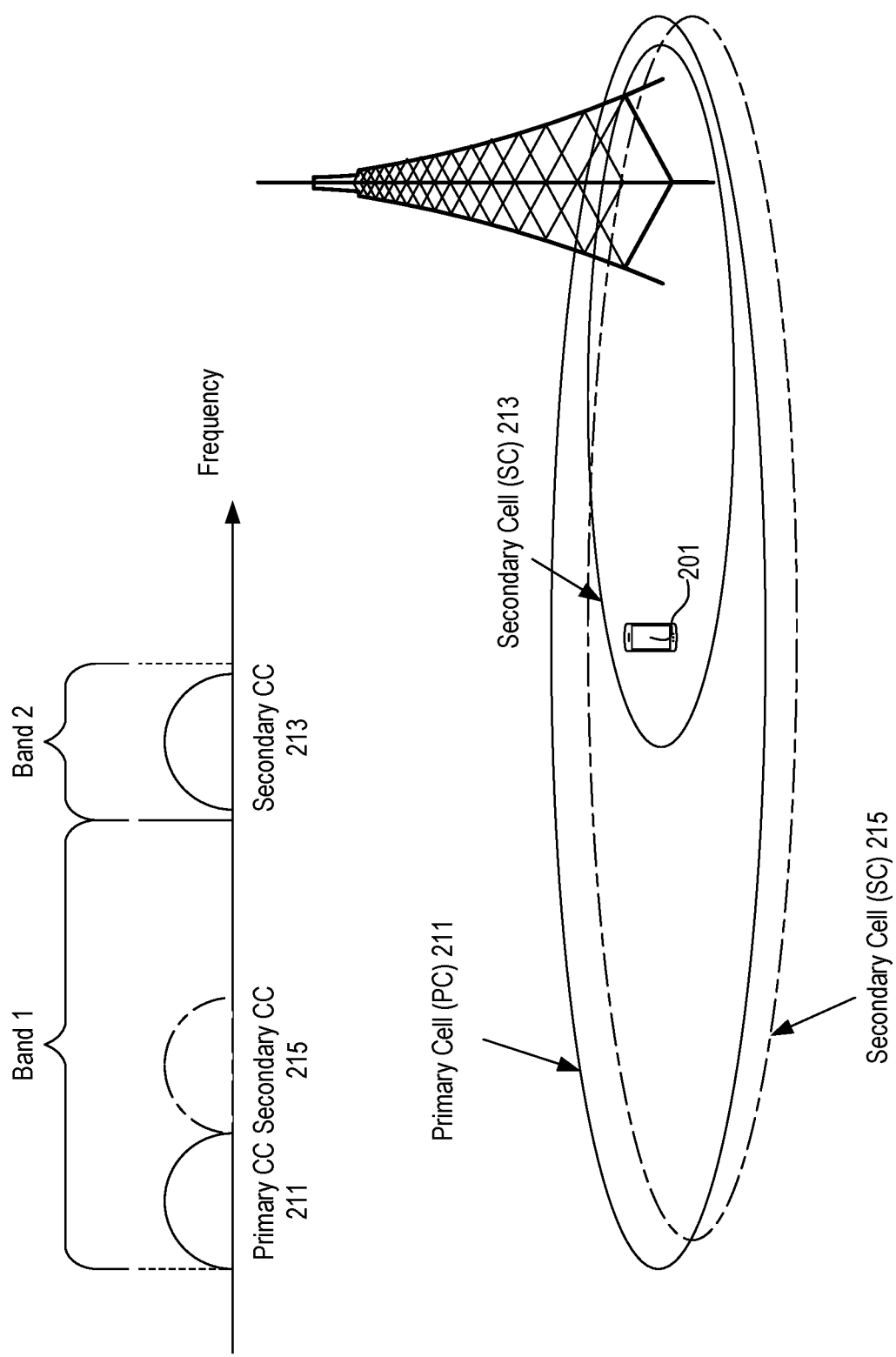
FIG. 2 illustrates an example of carrier aggregation with primary cell and secondary serving cells.

Carrier aggregation is used in wireless communication to increase bandwidth, thereby increasing transmission bitrate. Carrier aggregation can be used for both Frequency Division Duplexing (FDD) and Time Division Duplexing (TDD). FIG. 2 illustrates an example of carrier aggregation with primary cell 211 and secondary serving cells 213, 215, where each component carrier (CC) corresponds to a serving cell. As shown in FIG. 2, different component carriers can provide different coverages. The primary cell 211 and the secondary cell 215 in Band 1 provide wider coverage areas, while the secondary cell 213 in Band 2 provides a smaller coverage area. In the case of inter-band carrier aggregation (e.g., across Band 1 and Band 2 as depicted in FIG. 2), the component carriers experience different pathloss that increases with increasing frequency. In this specific example, carrier aggregation on all three component carriers can be used for the UE 201.

When needed, carrier aggregation can be triggered by activating secondary cells (SCells). Example SCell activation mechanisms include blind activation and activation based on data activity/channel state. Blind Scell activation is a dynamic activation/de-activation mechanism based on A1 & A2 measurement events regardless of data activity. Event A1 indicates that the serving cell becomes better than a threshold, while event A2 indicates that the serving cell becomes worse than the threshold. However, blind activation can result in UE power usage issues because CCs can be kept active even when not needed.

Figure 3:
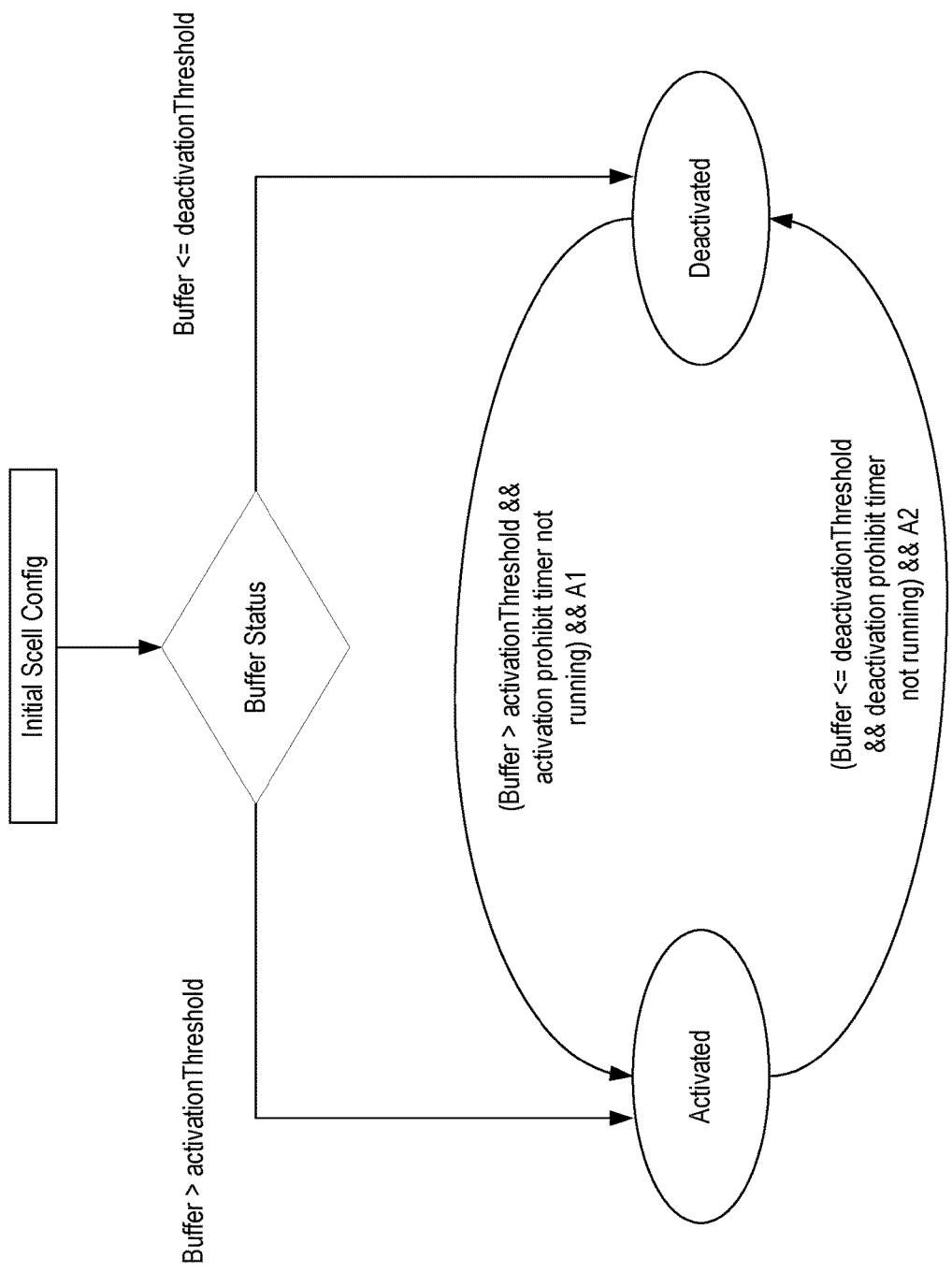
FIG. 3 illustrates an example flowchart for buffer based secondary cell activation and deactivation in accordance with one or more embodiments of the present technology.

SCell activation can also be performed based on factors such as data buffer size, channel quality, timing of activation or deactivation, and/or efficient allocation of base station resources. In particular, the buffer based SCell activation is an activation/de-activation mechanism that is triggered based on the buffer size that is associated with the traffic load, indicating the amount of data moving across a network at a given point of time. FIG. 3 illustrates an example flowchart for buffer based SCell activation/deactivation in accordance with one or more embodiments of the present technology. After the initial SCell configuration, the buffer status is monitored to determine if SCell needs to be activated. If the buffer size is greater than an activation threshold and the SCell is not activated yet, the SCell is activated. Similarly, if the buffer size is smaller than or equal to a deactivation threshold and the SCell is already activated, the SCell can be deactivated. Other criteria, such as one or more timers and/or A1/A2 events, can be used to change the activation state of the SCell.

Figure 4:
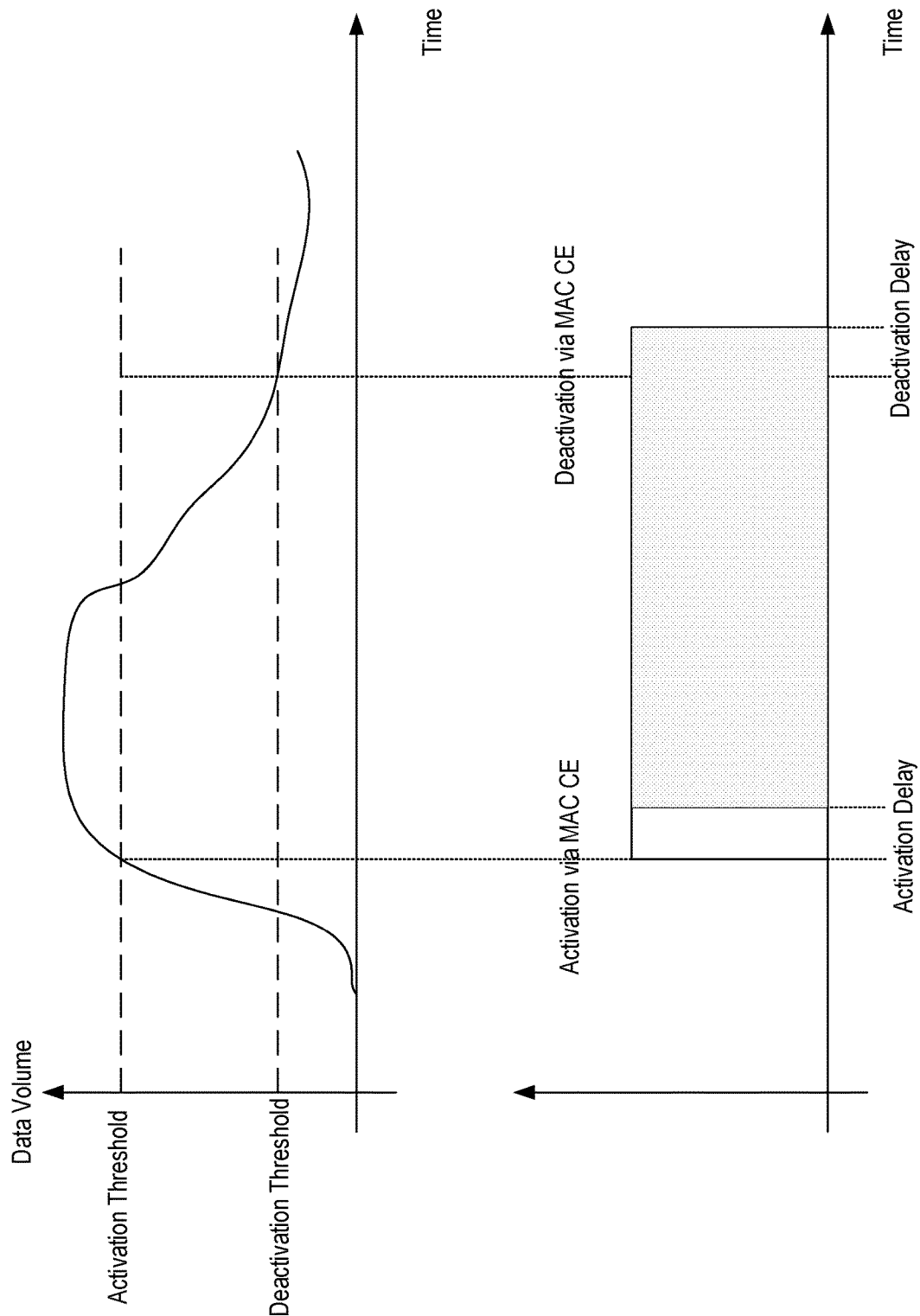
FIG. 4 illustrates an example plot of carrier aggregation based on activation and deactivation thresholds in accordance with one or more embodiments of the present technology.

FIG. 4 illustrates an example plot of carrier aggregation based on activation and deactivation thresholds in accordance with one or more embodiments of the present technology. When the buffer size is greater than an activation threshold, the SCell is activated via a Medium Access Control (MAC) Control Element (CE) from a base station. An activation delay can occur at the user equipment (UE) side before carrier aggregation takes effect. Similarly, if the buffer size is smaller than or equal to a deactivation threshold, the SCell is deactivated via a MAC CE. A deactivation delay can also occur on the UE side.

Currently, a single buffer threshold value (e.g., a single activation threshold, a single deactivation threshold) is applicable to all carrier aggregation carriers associated with a particular primary cell. However, in at least the example scenarios below, the use of a single threshold value can lead to load balancing issues and unnecessary delays.

Example Scenario 1

In this example scenario, a first component carrier (Carrier-1) is a TDD carrier in N41 band having a bandwidth of 100 MHz. A second component carrier (Carrier-2) is a TDD carrier in N41 band having a bandwidth 40 MHz. A third component carrier (Carrier-3) is a FDD carrier in N71 band having a bandwidth of 20 MHz. Two carrier aggregation combinations are configured. The first combination is Carrier-1+Carrier-2, where two TDD carriers having different bandwidths are aggregated. The second combination is Carrier-1+Carrier-3, where a TDD carrier and a FDD carrier are aggregated.

If buffer based SCell activation/de-activation is in use with a single activation threshold, the same threshold value is applied to two different secondary cells: Carrier-2 (TDD, 40 MHz) and Carrier-3 (FDD, 20 MHz). Carrier-2 has twice the bandwidth as Carrier-3 (e.g., 40 MHz v. 20 MHz), so the same activation threshold can easily congest Carrier-3. Furthermore, the usage of Carrier-2 can be severely limited if it can only be configured as a secondary component carrier.

Example Scenario 2

In some implementations, carriers provided by different base stations that are collocated can be aggregated. In this example scenario, a first component carrier (Carrier-4) is a TDD carrier in N41 band having a bandwidth of 100 MHz. A second component carrier (Carrier-5) is a TDD carrier in N41 band having a bandwidth 20 MHz. A third component carrier (Carrier-6) is a FDD carrier in N71 band having a bandwidth of 20 MHz.

In this example, because Carrier-5 and Carrier-6 have the same bandwidth, the load balancing is not as big a concern as in Example Scenario 2. Carrier-4 and Carrier-5 are provided by a first base station and Carrier-6 is provided by a second base station to form inter-base station carrier aggregation. The backhaul connection between the two base stations, however, can have inherent delays as compared to intra-base station carrier aggregation scenarios (no backhaul connection). In such cases, an intra-base station carrier aggregation configuration (e.g., Carrier-4+Carrier-5) is more desirable than an inter-base station carrier aggregation configuration (e.g., Carrier-4+Carrier-6) to avoid packet loss/delays.

The challenges exposed in the above example scenarios affect 5G NR communications to a larger extent because, compared to LTE communications that allow four bandwidths (5 MHz, 10 MHz, 15 MHz, and 20 MHz) with smaller differences, 5G carriers are configured with higher frequency bands and diverse bandwidth values. With the introduction of 5G NR communications, different deployment configurations, such as standalone NR deployment, non-standalone NR deployment, and deployment using different access technologies (LTE/NR) are available, thereby introducing both intra-/inter-base station scenarios. In order to address these issues, this patent document discloses techniques can be implemented in various embodiments to enable flexible threshold values so as to achieve load balancing on different carriers. The disclosed techniques can also differentiate inter-/intra-base station scenarios to account for possible efficiency loss and/or delays. In particular, a buffer threshold can be defined per carrier aggregation candidate based on factors such as bandwidths, intra-/inter-base station configurations, etc.

Figure 5:
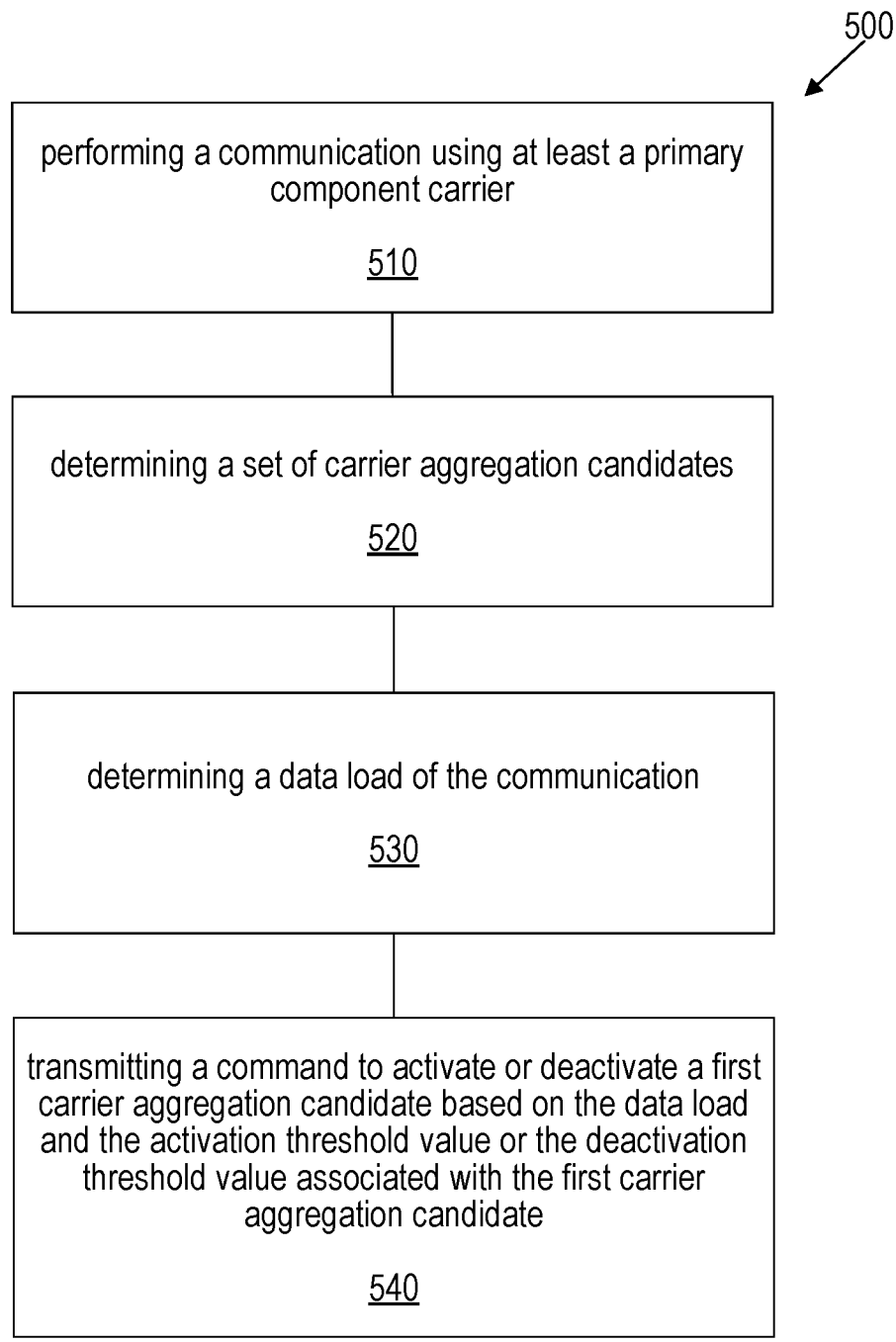
FIG. 5 is a flowchart representation of a process or a method for telecommunication in accordance with one or more embodiments of the present technology.

FIG. 5 is a flowchart representation of a method or a process for wireless communication in accordance with one or more embodiments of the present technology. The process 500 includes, at operation 510, performing, by a base station, a communication with a user equipment using at least a primary component carrier. The communication can be a transmission on a downlink data channel, a downlink control channel, an uplink data channel, and/or an uplink control channel, or other types of channels (e.g., broadcast channels). The process 500 includes, at operation 520, determining, by the base station, a set of carrier aggregation candidates. Each carrier aggregation candidate in the set of carrier aggregation candidates corresponds to a secondary component carrier and is associated with an activation threshold value and a deactivation threshold value that are determined based on a characteristic of the secondary component carrier. The characteristic comprises at least one of: a bandwidth of the secondary component carrier, whether the secondary component carrier is a TDD carrier or a FDD carrier, or whether the primary component carrier and the secondary component carrier are provided by the base station (e.g., intra-base station or inter-base station). The process 500 includes, at operation 530, determining, by the base station, a traffic load of the communication. The process 500 includes, at operation 540, transmitting, by the base station, a command to the user equipment to activate or deactivate a first carrier aggregation candidate in the set of carrier aggregation candidates based on the traffic load and the activation threshold value or the deactivation threshold value associated with the first carrier aggregation candidate.

In some embodiments, the process includes dynamically adjusting, by the base station, the activation threshold value or the deactivation threshold value for a carrier aggregation candidate in the set of carrier aggregation candidates based on characteristics of secondary component carriers corresponding to the set of carrier aggregation candidates. In some embodiments, the activation threshold value or the deactivation threshold value of a carrier aggregation candidate in the set of carrier aggregation candidates is inversely proportional to the bandwidth. In some implementations, the bigger the bandwidth, the lower the threshold, to avoid congesting carriers with smaller bandwidths. For example, a threshold value of 400 bytes can be used for a component carrier having 40 MHz bandwidth, while a threshold value of 800 bytes can be used for a component carrier having 20 MHz bandwidth so that carriers with smaller bandwidths are not easily congested.

In some embodiments, the process includes determining, by the base station, a total bandwidth of one or more carrier aggregation candidates provided by a different base station; and determining, by the base station, an activation threshold value or a deactivation threshold value for the one or more carrier aggregation candidates. The activation threshold value or the deactivation threshold value is inversely proportional to the total bandwidth. In some implementations, for inter-base station situations, the bandwidths of all external secondary components can be calculated to determine the activation/deactivation threshold(s) for inter-base station carrier aggregation candidates.

In some embodiments, the process includes applying, by the base station, a weighted factor to activation threshold values of one or more carrier aggregation candidates provided by a different base station. That is, inter-base station and intra-base station component carriers can be assigned different weights to determine the respective thresholds. For example, the intra-base station carriers are assigned a weighted factor of 1 while the inter-base station carriers are assigned a weighted factor of 1.5 or 2, resulting in higher thresholds so as to avoid the potential packet loss/delay from the inter-base station backhaul.

Figure 6:
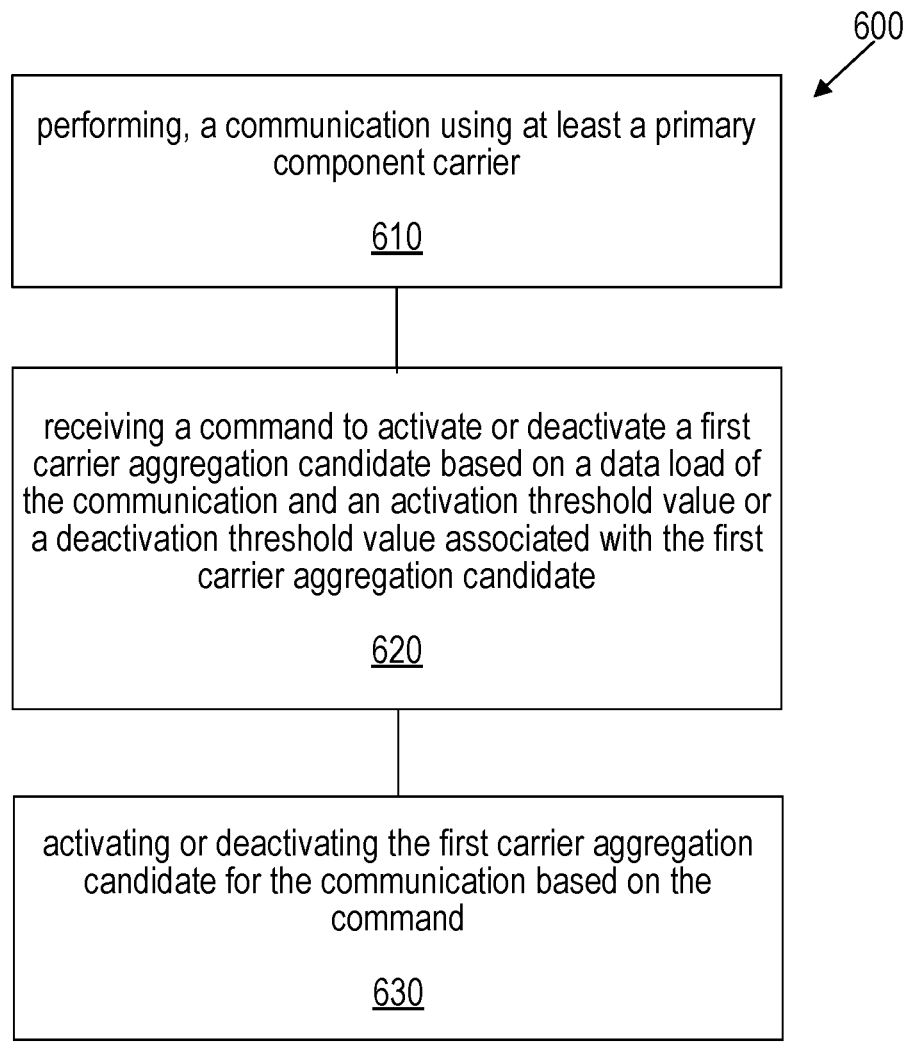
FIG. 6 is a flowchart representation of another process or method for telecommunication in accordance with one or more embodiments of the present technology.

FIG. 6 is a flowchart representation of a method or a process for wireless communication in accordance with one or more embodiments of the present technology. The process 600 includes, at operation 610, performing, by a user equipment, a communication with a base station using at least a primary component carrier. The process 600 includes, at operation 620, receiving, by the user equipment, a command from the base station to activate or deactivate a first carrier aggregation candidate in a set of carrier aggregation candidates based on a traffic load of the communication and an activation threshold value or a deactivation threshold value associated with the first carrier aggregation candidate. Each carrier aggregation candidate in the set of carrier aggregation candidates corresponds to a secondary component carrier. The activation threshold value and the deactivation threshold value for each carrier aggregation candidate are determined based on a characteristic of the secondary component carrier. The process 600 includes, at operation 630, activating or deactivating the first carrier aggregation candidate for the communication based on the command. The characteristic comprises at least one of: a bandwidth of the secondary component carrier, whether the secondary component carrier is a Time Division Duplexing carrier or a Frequency Division Duplexing carrier, or whether the primary component carrier and the secondary component carrier are provided by the base station. In some embodiments, the activation threshold value or the deactivation threshold value of a carrier aggregation candidate in the set of carrier aggregation candidates is inversely proportional to a bandwidth of each carrier aggregation candidate.

The disclosed processes above are applicable in a standalone deployment of New Radio (NR) access technology, a non-standalone deployment of NR access technology, or a deployment using both NR access technology and Long Term Evolution (LTE) access technology. The communication can be performed using an aggregation of two component carriers or more than two component carriers (e.g., 2CC, 3CC and/or beyond). The disclosed processes are also applicable to both downlink communications from the base station to the user equipment and uplink communications from the user equipment to the base station. Furthermore, as shown in FIG. 2, both intra-band and inter-band carrier aggregations are supported.

For example, the disclosed techniques can be applied to the Example Scenario 1 above. Given three component carriers Carrier-1, Carrier-2, and Carrier-3 provided by the same base station (intra-base station), different carrier aggregation combinations can be configured as follows:

A: Using Carrier-1 as the primary cell.

A-1: Carrier-2 can be configured as a SCell candidate. Because Carrier-2 is a TDD carrier with a bandwidth of 40 MHz, an activation threshold can be set to 400 Bytes and a deactivation threshold can be set to 100 Bytes.

A-2: Carrier-3 can be configured as a SCell candidate. Because Carrier-3 is a FDD carrier with a bandwidth of 20 MHz, an activation threshold can be set to 800 Bytes and a deactivation threshold can be set to 200 Bytes. Carrier-3 is a FDD carrier and offers a smaller bandwidth than Carrier-2, so the activation of Carrier-3 carrier aggregation combination is triggered to accommodate higher traffic load and to avoid data congestion on Carrier-3.

B: Using Carrier-2 as the primary cell.

B-1: Carrier-1 can be configured as a SCell candidate. Because Carrier-1 is a TDD carrier with a bandwidth of 100 MHz, an activation threshold can be set to 200 Bytes and a deactivation threshold can be set to 50 Bytes.

B-2: Carrier-3 can be configured as a SCell candidate. Because Carrier-3 is a FDD carrier with a bandwidth of 20 MHz, an activation threshold can be set to 800 Bytes and a deactivation threshold can be set to 200 Bytes. Carrier-3 is a FDD carrier and offers a smaller bandwidth than Carrier-2, so the activation of Carrier-3 carrier aggregation combination is triggered to accommodate higher traffic load and to avoid data congestion on Carrier-3.

C: Using Carrier-3 as the primary cell.

C-1: Carrier-1 can be configured as a SCell candidate. Because Carrier-1 is a TDD carrier with a bandwidth of 100 MHz, an activation threshold can be set to 200 Bytes and a deactivation threshold can be set to 50 Bytes.

C-2: Carrier-2 can be configured as a SCell candidate. Because Carrier-2 is a TDD carrier with a bandwidth of 40 MHz, an activation threshold can be set to 400 Bytes and a deactivation threshold can be set to 100 Bytes. Carrier-2 offers a smaller bandwidth than Carrier-1, so the activation of Carrier-2 carrier aggregation combination is triggered to accommodate higher traffic load and to avoid data congestion on Carrier-2.

The disclosed can also be applied to the Example Scenario 2 above. Given that component carriers Carrier-4 and Carrier-5 are provided by a first base station and Carrier-6 is provided by a second base station (inter-base station), different carrier aggregation combinations can be configured as follows:

D: Using Carrier-4 as the primary cell.

D-1: Carrier-5 can be configured as a SCell candidate for intra-base station carrier aggregation. Because Carrier-2 is a TDD carrier with a bandwidth of 20 MHz, an activation threshold can be set to 800 Bytes and a deactivation threshold can be set to 200 Bytes.

D-2: Carrier-6 can be configured as a SCell candidate for inter-base station carrier aggregation. Because Carrier-6 is a FDD carrier with a bandwidth of 20 MHz provided by a different base station, an activation threshold can be set to 1600 Bytes and a deactivation threshold can be set to 400 Bytes, with a weighted factor of 2. Carrier-6 offers the same bandwidth but comes with potential packet loss/delay on the backhaul link, so the activation of Carrier-6 carrier aggregation combination is only triggered to accommodate much higher traffic load.

E: Using Carrier-5 as the primary cell.

E-1: Carrier-4 can be configured as a SCell candidate for intra-base station carrier aggregation. Because Carrier-4 is a TDD carrier with a bandwidth of 100 MHz, an activation threshold can be set to 200 Bytes and a deactivation threshold can be set to 50 Bytes.

E-2: Carrier-6 can be configured as a SCell candidate for inter-base station carrier aggregation. Because Carrier-6 is a FDD carrier with a bandwidth of 20 MHz provided by a different base station, an activation threshold can be set to 1600 Bytes and a deactivation threshold can be set to 400 Bytes, with a weighted factor of 2. Carrier-6 offers a smaller bandwidth and comes with potential packet loss/delay on the backhaul link, so the activation of Carrier-6 carrier aggregation combination is only triggered to accommodate much higher traffic load.

F: Using Carrier-6 as the primary cell.

Figure 7:
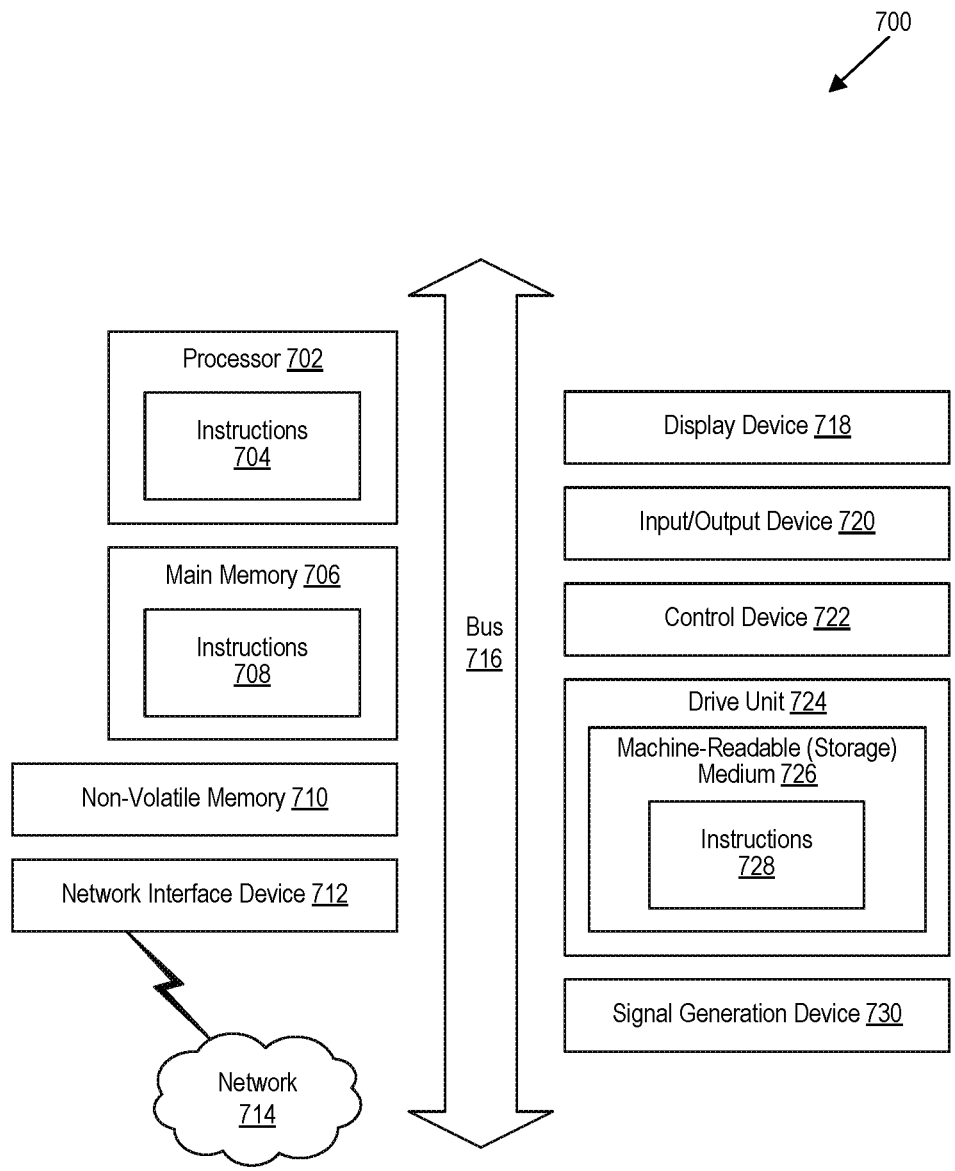
FIG. 7 is a block diagram that illustrates components of a computing device.

F-1: Carrier-4 can be configured as a SCell candidate for inter-base station carrier aggregation. Carrier-4 is a TDD carrier with a bandwidth of 100 MHz but comes with potential packet loss/delay on the backhaul link, so an activation threshold can be set to 300 Bytes and a deactivation threshold can be set to 75 Bytes, with a weighted factor of 1.5. In some implementation, however, a weighted factor of 1 is applied because all candidates are inter-base station carriers. The activation threshold can be set to 200 Bytes and a deactivation threshold can be set to 50 Bytes F-2: Carrier-5 can be configured as a SCell candidate for inter-base station carrier aggregation. Carrier-6 is a FDD carrier with a bandwidth of 20 MHz but comes with potential packet loss/delay on the backhaul link, so an activation threshold can be set to 1200 Bytes and a deactivation threshold can be set to 300 Bytes, with a weighted factor of 1.5. In some implementation, however, a weighted factor of 1 is applied because all candidates are inter-base station carriers. The activation threshold can be set to 800 Bytes and a deactivation threshold can be set to 200 Bytes Computer System FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A method for wireless communication, comprising:
    performing, by a base station, a communication with a user equipment using at least a primary component carrier;
    determining, by the base station, a set of carrier aggregation candidates,
        wherein each carrier aggregation candidate in the set of carrier aggregation candidates corresponds to a secondary component carrier and is associated with an activation threshold value and a deactivation threshold value that are determined based on a characteristic of the secondary component carrier, and
        wherein the characteristic comprises: (1) a bandwidth of the secondary component carrier, and (2) whether the primary component carrier and the secondary component carrier are provided by the base station;
    determining, by the base station, a total bandwidth of one or more carrier aggregation candidates provided by a different base station;
    determining, by the base station, an activation threshold value or a deactivation threshold value for the one or more carrier aggregation candidates;
    determining, by the base station, a traffic load of the communication; and
    transmitting, by the base station, a command to the user equipment to activate or deactivate a first carrier aggregation candidate in the set of carrier aggregation candidates based on the traffic load and the activation threshold value or the deactivation threshold value associated with the first carrier aggregation candidate.

2. The method of claim 1, wherein the activation threshold value or the deactivation threshold value for the one or more carrier aggregation candidates provided by the different base station is inversely proportional to the bandwidth.

3. The method of claim 1, comprising:
    dynamically adjusting, by the base station, the activation threshold value or the deactivation threshold value for a carrier aggregation candidate in the set of carrier aggregation candidates based on characteristics of secondary component carriers corresponding to the set of carrier aggregation candidates.

4. The method of claim 1, comprising:
    applying, by the base station, a weighted factor to activation threshold values of one or more carrier aggregation candidates provided by a different base station.

5. The method of claim 1, wherein the method is applicable in a standalone deployment of New Radio (NR) access technology, a non-standalone deployment of NR access technology, or a deployment using both NR access technology and Long Term Evolution (LTE) access technology.

6. The method of claim 1, wherein the communication is performed using an aggregation of two component carriers or more than two component carriers.

7. The method of claim 1, wherein the communication comprises a downlink communication from the base station to the user equipment or an uplink communication from the user equipment to the base station.

8. The method of claim 1, wherein at least one carrier aggregation candidate corresponds to a first component carrier that is in a different frequency band as the primary component carrier.

9. A method of wireless communication, comprising:
    performing, by a user equipment, a communication with a base station using at least a primary component carrier, wherein the communication is performed using an aggregation of two component carriers or more than two component carriers;
    receiving, by the user equipment, a command from the base station to activate or deactivate a first carrier aggregation candidate in a set of carrier aggregation candidates based on a traffic load of the communication and an activation threshold value or a deactivation threshold value associated with the first carrier aggregation candidate,
        wherein each carrier aggregation candidate in the set of carrier aggregation candidates corresponds to a secondary component carrier, and wherein at least one carrier aggregation candidate in the set of carrier aggregation candidates corresponds to a first component carrier that is in a different frequency band as the primary component carrier, and
        wherein the activation threshold value and the deactivation threshold value for each carrier aggregation candidate are determined based on a characteristic of the secondary component carrier, the characteristic comprising whether the primary component carrier and the secondary component carrier are provided by the base station; and
    activating or deactivating the first carrier aggregation candidate for the communication based on the command.

10. The method of claim 9, wherein the characteristic further comprises at least one of: a bandwidth of the secondary component carrier, or whether the secondary component carrier is a Time Division Duplexing carrier or a Frequency Division Duplexing carrier.

11. The method of claim 9, wherein the activation threshold value or the deactivation threshold value of a carrier aggregation candidate in the set of carrier aggregation candidates is inversely proportional to a bandwidth of each carrier aggregation candidate.

12. The method of claim 9, wherein the method is applicable in a standalone deployment of New Radio (NR) access technology, a non-standalone deployment of NR access technology, or a deployment using both NR access technology and Long Term Evolution (LTE) access technology.

13. The method of claim 9, wherein the communication comprises a downlink communication from the base station to the user equipment or an uplink communication from the user equipment to the base station.

14. A device for wireless communication, comprising a processor and a memory, wherein the processor is configured to:

perform communication with a user equipment using at least a primary component carrier;

determine a set of carrier aggregation candidates,
  wherein each carrier aggregation candidate in the set of carrier aggregation candidates corresponds to a secondary component carrier and is associated with an activation threshold value and a deactivation threshold value that are determined based on a characteristic of the secondary component carrier,
  wherein at least one carrier aggregation candidate in the set of carrier aggregation candidates corresponds to a first component carrier that is in a different frequency band as the primary component carrier, and
  wherein the characteristic comprises at least one of: a bandwidth of the secondary component carrier, or whether the primary component carrier and the secondary component carrier are provided by a same base station;

determine a traffic load of the communication; and transmit a command to the user equipment to activate or deactivate a first carrier aggregation candidate in the set of carrier aggregation candidates based on the traffic load and the activation threshold value or the deactivation threshold value associated with the first carrier aggregation candidate.

15. The device of claim 14, wherein the processor is configured to:
  dynamically adjust the activation threshold value or the deactivation threshold value for a carrier aggregation candidate in the set of carrier aggregation candidates based on characteristics of secondary component carriers corresponding to the set of carrier aggregation candidates.

16. The device of claim 14, wherein the activation threshold value or the deactivation threshold value of a carrier aggregation candidate in the set of carrier aggregation candidates is inversely proportional to the bandwidth.

17. The device of claim 14, wherein the processor is configured to:
  determine a total bandwidth of one or more carrier aggregation candidates provided by a different base station; and
  determine an activation threshold value or a deactivation threshold value for the one or more carrier aggregation candidates, wherein the activation threshold value or the deactivation threshold value is inversely proportional to the total bandwidth.

18. The device of claim 14, wherein the processor is configured to: apply a weighted factor to activation threshold values of one or more carrier aggregation candidates provided by a different base station.

* * * * *